US Patent Number: 4,679,827
Date of Patent: Jul. 14, 1987
Inventor: Joseph P. Law, Scotch Plains, N.J.
Assignee: Thomas & Betts Corporation, Raritan, N.J.

[54] RAINTIGHT AND OILTIGHT CONNECTOR FOR FLEXIBLE CONDUIT

[21] Appl. No.: 770,899
[22] Filed: Aug. 30, 1985

Related U.S. Application Data

[63] Continuation-in-part of Ser. No. 687,107, Dec. 28, 1984, abandoned.

[51] Int. Cl.$^4$ .................................... F16L 41/00
[52] U.S. Cl. .................................... 285/158; 285/331; 285/319; 285/423; 285/921; 285/278
[58] Field of Search .............. 285/158, 161, 331, 175, 285/178, 423, 319, 921; 174/65 R

[56] References Cited

U.S. PATENT DOCUMENTS

| | | | |
|---|---|---|---|
| 524,659 | 8/1894 | Winslow . | |
| 646,009 | 3/1900 | Patischer . | |
| 696,702 | 4/1902 | Weitz . | |
| 1,005,751 | 10/1911 | Schweitzer . | |
| 1,039,354 | 9/1912 | Bonadio . | |
| 1,043,806 | 11/1912 | Dahl | 285/331 X |
| 1,078,727 | 11/1913 | Geiger . | |
| 1,190,766 | 7/1916 | Hubbard . | |
| 1,516,452 | 11/1924 | Neuschel . | |
| 2,359,846 | 10/1944 | Hayman | 285/25 |
| 2,379,547 | 7/1945 | Sperry . | |
| 2,396,123 | 3/1946 | Phillips . | |
| 2,498,395 | 2/1950 | Coss . | |
| 2,561,827 | 7/1951 | Soos | 285/331 X |
| 2,987,329 | 6/1961 | Barton | 285/149 |
| 3,394,954 | 7/1968 | Sarns | 285/319 |
| 3,455,579 | 7/1969 | Olliff, Jr. et al. | 285/39 |
| 3,493,251 | 2/1970 | Kramer | 285/260 |
| 3,525,068 | 8/1970 | Nelson | 339/41 |
| 3,640,552 | 2/1972 | Demler, Sr. et al. | 285/319 X |
| 3,659,880 | 5/1972 | Goldsobel | 285/423 X |
| 3,670,726 | 6/1972 | Mahon et al. | 285/278 X |
| 3,768,476 | 10/1973 | Raitto | 128/275 |
| 3,840,256 | 10/1974 | Cox, Jr. | 285/174 |
| 3,928,715 | 12/1975 | Holden | 174/47 |
| 4,054,306 | 10/1977 | Sadoff, Jr. et al. | 285/278 X |
| 4,099,744 | 7/1978 | Kutnyak et al. | 285/7 |
| 4,123,091 | 10/1978 | Cosentino et al. | 285/39 |
| 4,133,312 | 1/1979 | Burd | 128/214 |
| 4,214,779 | 7/1985 | Losell | 285/93 |
| 4,225,162 | 9/1980 | Dola | 285/331 X |
| 4,451,069 | 5/1984 | Melone | 285/921 X |

FOREIGN PATENT DOCUMENTS

| | | | |
|---|---|---|---|
| 485728 | 8/1952 | Canada . | |
| 31409 | 7/1981 | European Pat. Off. | 285/921 |
| 2946915 | 11/1981 | Fed. Rep. of Germany . | |
| 723647 | 2/1955 | United Kingdom . | |

*Primary Examiner*—Thomas F. Callaghan
*Attorney, Agent, or Firm*—Robert M. Rodrick; Salvatore J. Abbruzzese

[57] ABSTRACT

A raintight and oiltight connector is disclosed for securing an electrical conduit for an electrical enclosure. The connector includes first and second housing members which are rotatably attached and supports the conduit at one end and can be screw inserted into a threaded opening of an electrical enclosure at the other end.

9 Claims, 4 Drawing Figures

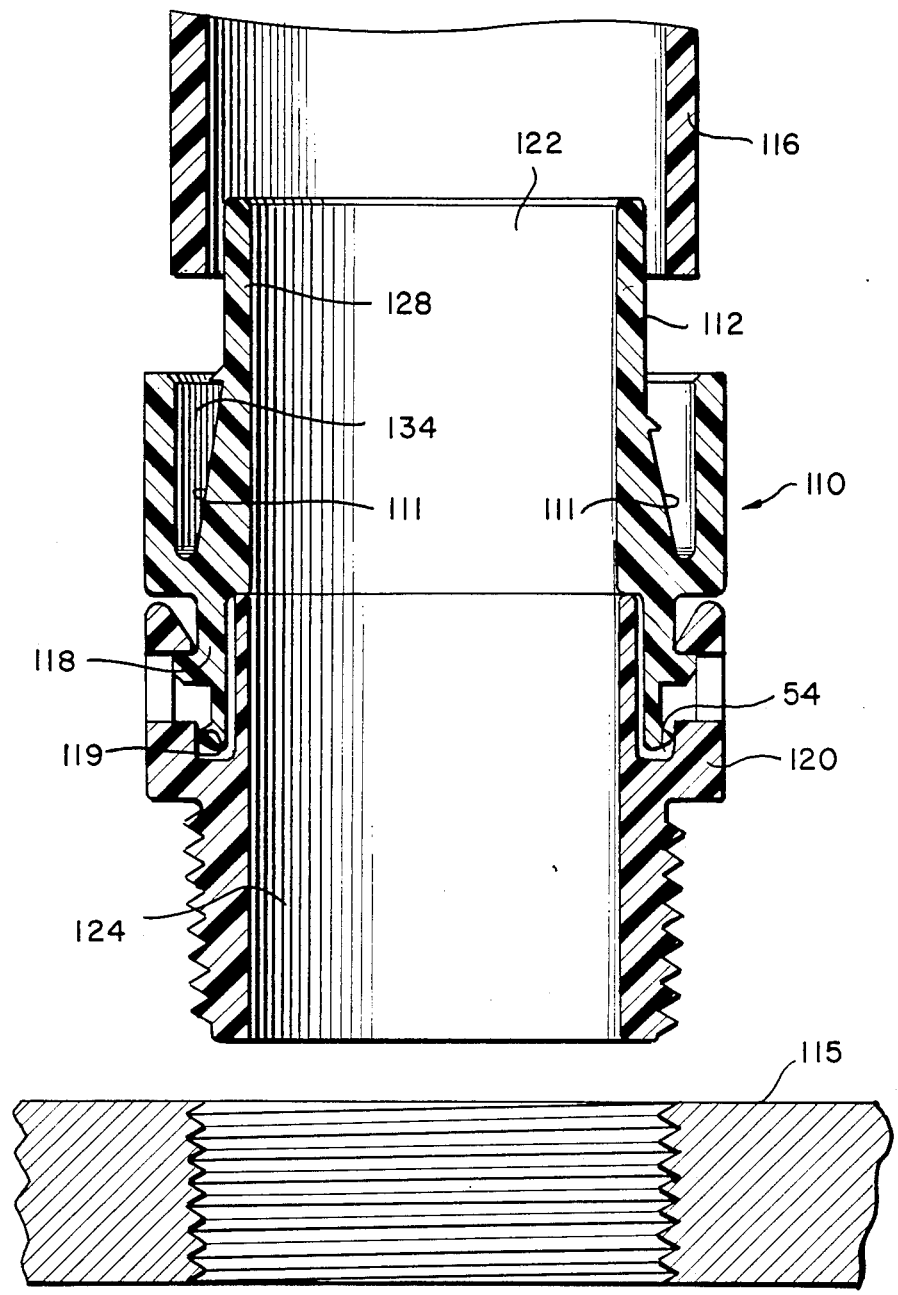

RAINTIGHT AND OILTIGHT CONNECTOR FOR FLEXIBLE CONDUIT

CROSS REFERENCE TO RELATED APPLICATIONS

This Application is a continuation-in-part of U.S. application, Ser. No. 687,107, filed Dec. 28, 1984 and now abandoned.

FIELD OF INVENTION

This invention relates generally to an apparatus for connecting flexible electrical conduit to an electrical enclosure such as a junction box. More particularly, the invention relates to a connector for providing raintight and oiltight connection between an electrical conduit and an electrical enclosure.

BACKGROUND OF THE INVENTION

In connecting flexible conduit containing electrical cables to a junction box or similar electrical enclosure, it is often necessary to ensure that the resulting connection is raintight, i.e. that water, due to beating rain or similar intermittent weather conditions, does not enter the conduit or the junction box through the connector. Typically, connectors used for coupling flexible conduit to a junction box include a one piece water-tight housing which fixedly engages the flexible conduit. In order to provide a watertight seal between the conduit and the connector housing, the conduit is nonmovably attached to the connector housing, a watertight seal being provided at the intimate engagement of the plastic connector housing and the plastic flexible conduit. However a major drawback of this construction is that this type of connector cannot be screw inserted into a threaded opening in a junction box, as once a length of conduit is attached to the connector, the one piece connector can no longer be rotated into the threaded opening.

The art has also seen the use of rotatably connectable two piece housing members which permit connection to the conduit. One piece is rotatably attached to a second piece which in turn can be screw inserted into a threaded hold in the junction box. However, at the juncture of the two pieces of this type connector, raintight connection may not be maintained. In order to maintain an effective raintight seal at the juncture of two rotatably coupled members a sealing ring or similar elastomeric grommet or bushing is needed. Once an elastomeric member is inserted between two coupled parts, their relative mobility is decreased due to frictional engagement. Further, the installer must couple multiple connector parts to provide a complete raintight connection. In addition, these multi-piece connector require extra connector parts including the elastomeric sealing ring which may be subject to wear and degradation upon frequent rotation of the parts. Once the sealing ring is damaged or worn, the connector will no longer be raintight.

Additionally, in typical applications the flexible conduit is screw threaded onto a cylindrical body, the screw engagement of the threads of the body with the plastic conduit provide a watertight seal. However, it has been found that connection may be susceptible to flow of low viscosity fluid (oil) which may be present in the environment in which these connectors are used.

It is, therefore, desirous to provide a raintight and oiltight connector which can be screw inserted into a threaded opening of a junction box and yet employ minimal parts to reduce the adverse effect of wear on the connector.

SUMMARY OF THE INVENTION

It is an object of the present invention to provide an improved conduit connector for attaching flexible conduit to an electrical enclosure.

It is a more particular object of the present invention to provide a raintight and oiltight connector for flexible conduit which can be screw inserted into a threaded opening of an electrical enclosure.

In the attainment of the foregoing and other objects, the invention looks toward providing a raintight and oiltight connector having a pair of mating rotatably coupled connector parts. One portion of the connector accommodates a flexible conduit and the other would be screw insertable into a threaded opening of the electrical enclosure. The juncture of the two parts would provide a raintight and oiltight seal without the need of the sealing ring.

In a particular embodiment described herein, a connector for coupling electrical conduit to an electrical enclosure is disclosed having a first housing including a passage therethrough for receipt of the conduit. A second housing coupled to the first housing for rotatable movement therebetween includes a second passage therethrough in communication with the first passage. The second housing includes means for engagement with the electrical enclosure. The second housing further includes an open ended annular channel for receipt of a portion of the first housing. Integrally formed sealing means is provided on said second housing, which is insertable into said open ended annular channel for providing an oiltight seal therebetween.

BRIEF DESCRIPTION OF THE DRAWINGS

FIG. 4, in a preferred embodiment of the present invention, shows a diametrical sectional showing of an assembled raintight and oiltight connector.

DETAILED DESCRIPTION OF THE PREFERRED EMBODIMENTS

Figure 1:
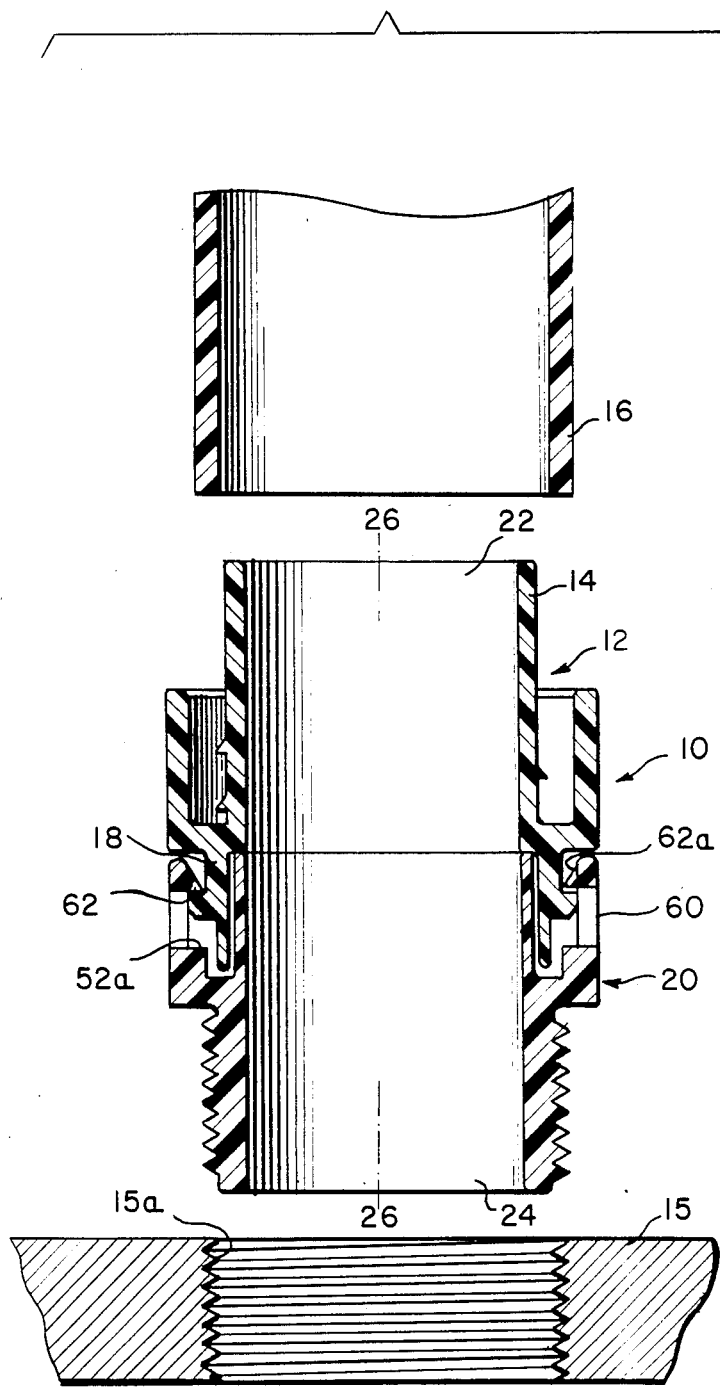
FIG. 1 is a diametrical sectional showing of the assembled electrical connector of the present invention, with the flexible conduit and junction box shown in exploded view.

Referring to the drawings, connector 10 of the present invention is an elongate generally cylindrical member which includes a first housing 12 and a second housing 20 which are coupled along a central axis 26. As presented in the drawings, central axis 26 is oriented vertically. For simplicity of explanation, reference will be made to connector 10 in a similar vertical orientation. It is however understood that connector 10 may be employed in any disposition.

Figure 2:
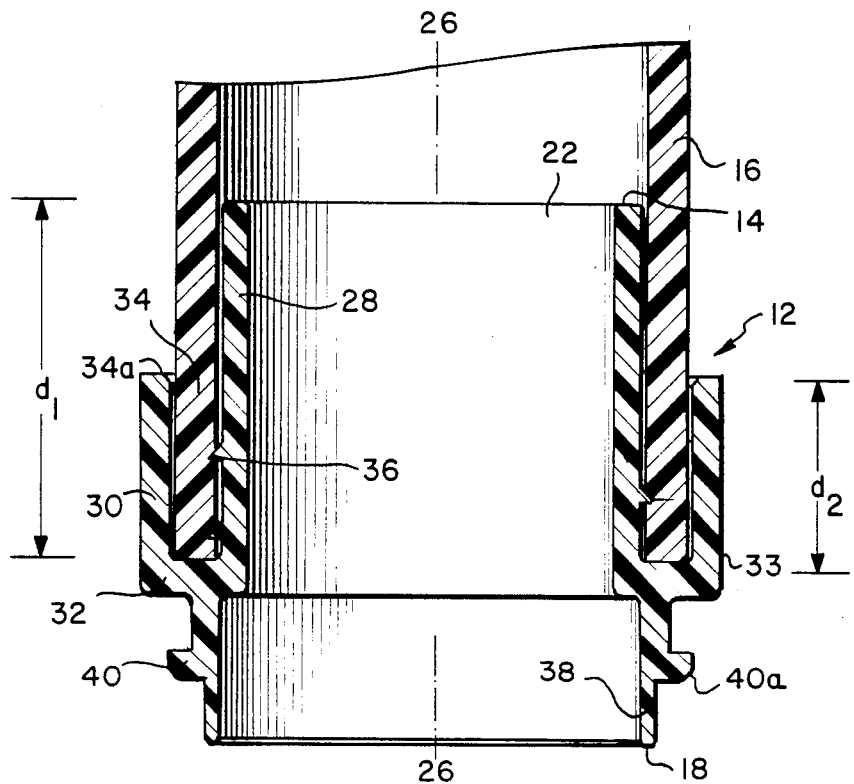
FIGS. 2 and 3 show the first and second housing respectively of the electrical connector of FIG. 1 in disassembled condition, with the flexible conduit and junction box attached.

As is shown in detail in FIG. 2, first housing 12 of connector 10 is an elongate, hollow, generally cylindrical member having a conduit receiving end 14, an insertion end 18 and a cylindrical bore 22 therebetween. First housing 12 is formed by a pair of spaced apart substantially concentric cylindrical walls 28 and 30 which extend in an axial direction from a common central annular shoulder 32. First cylindrical wall 28 which is interior of second cylindrical wall 30, extends in an axial direction from shoulder 32 a length $d_1$. Second cylindrical wall 30 extends in an axial direction from shoulder 32 a length $d_2$ which is less than $d_1$ to form an annular skirt 33 exteriorly of first cylindrical wall 38. Cylindrical walls 28 and 30 mutually define an upwardly opening annular channel 34 for receipt of flexible conduit 16. Flexible conduit 16, which is typically formed of plastic or other relatively pliable material, can be screw threaded into annular channel 34 for secure accommodation therein. To facilitate such screw insertion, cylindrical wall 28 includes on the outside surface thereof a helical thread 36 which extends into annular channel 34. As will be described further hereinbelow, the screw engagement of flexible conduit 16 and annular channel 34 will be raintight.

Extending axially from shoulder 32 in the direction opposite that of cylindrical walls 28 and 30 is hollow cylindrical member 38 which defines insertion end 18. Cylindrical member 38 includes an annular protrusion 40 extending radially outwardly therefrom. Annular protrusion 40 is accommodated in a corresponding recess in second housing 20 for rotatable movement therewith as will be described in greater detail hereinafter.

Figure 3:
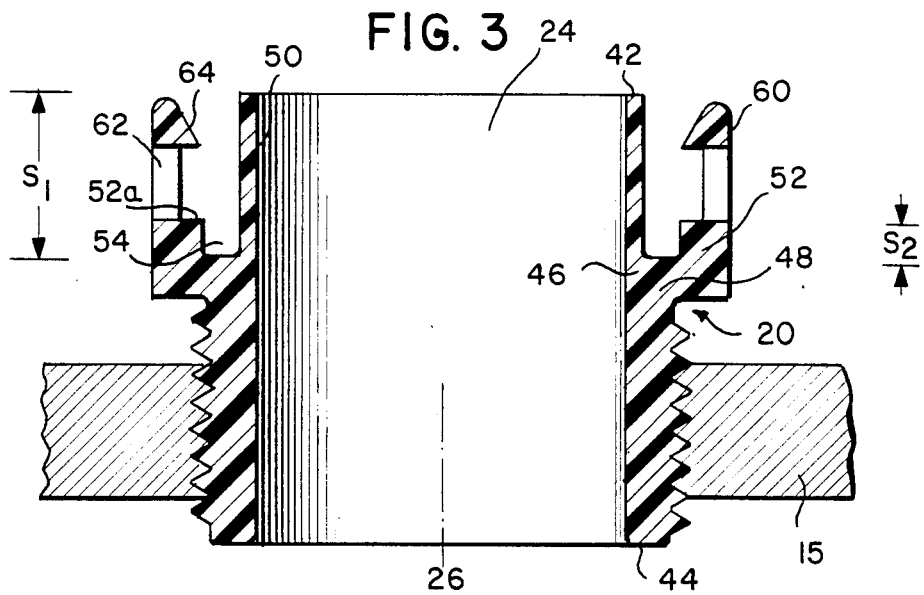

Referring additionally to FIG. 3, second housing 20 is an elongate, generally cylindrical member having a reception end 42 for connection with first housing 12, a connection end 44 for connection to a junction box 15, and a central bore 24 therebetween. The connection end 44 may include external screw threads 44a for screw attachment to a threaded opening 15a of junction box 15 as will be further described hereinafter. Second housing 20 includes a first cylindrical wall 46 which extends between reception end 42 and connection end 44 and defines central bore 24. As shown in FIG. 1, central bore 24 is axially aligned and in communication with central bore 22 of first housing 12. An annular shoulder 48 extends radially outwardly from and substantially perpendicular to cylindrical wall 46, and is centrally located along second housing 20. Extending longitudinally from shoulder 48 in the direction of central axis 26, is an upper portion 50 of cylindrical wall 46. Upper portion 50 extends in the axial direction a length $s_1$ from shoulder 48 toward first housing 12 (FIG. 1). A second annular wall 52 which is exterior of upper portion 50 and substantially concentric therewith extends from the outer radial portion of shoulder 48. Outer annular wall 52 extends longitudinally along the direction of axis 25 a distance $s_2$ which is less than $s_1$. Upper portion 50 and annular wall 52 mutually define therebetween an open ended annular channel 54 which accommodates therein insertion end 18 of first housing 12. The wall thickness of cylindrical member 38 defining insertion end 18 is substantially less than the width of annular channel 54 as defined between upper portion 50 and annular wall 52. Thus, there is a clearance between annular channel 54 and cylindrical member 38, which permits free rotation of first housing 12 with respect to second housing 20.

Second housing 20 further includes a plurality of circumferentially spaced locking elements 60 which extend axially from annular wall 52. In the present illustrative embodiment, four locking members are shown, each spaced 90° from the adjacent locking element. Each of locking element 60 includes a wall portion 62 which extends substantially parallel to central axis 26 and an inwardly directed tab 64 at the upper end thereof extending substantially perpendicular to central axis 26.

As seen in FIG. 1 in assembled condition, tab 62 includes a beveled wall 62a which permits snap-in insertion of first housing 12 with second housing 20. The beveled wall 62a engages a mating beveled surface 40a of protrusion 40 of second housing 20 to permit deflection of locking elements 60. Once past protrusion 40, the locking elements 60 will snap back to provide captive receipt of first housing 12 in second housing 20. In assembled condition (FIG. 1), the upper extent of locking element 60 is spaced slightly from shoulder 32 of first housing 12 and insertion end 18 is spaced from the floor of annular channel 54 to provide a relatively loose fit between first housing 12 and second housing 20. The locking relationship of tab 62 with shoulder 40 prevents disconnection of the two parts. As above-described the loose fit relationship between cylindrical member 38 of first housing 12 and annular channel 54 allows for free rotation of first housing 12 with respect to second housing 20.

Having described the parts in detail, the termination of the connector of the present invention may now be described. Connector 10 is used in the assembled condition as shown in FIG. 1. First housing 12 and second housing 20 are mutually captively retained by the interfitting relationship between annular protrusion 40 and tabs 62. In this assembled condition, one of the housing portions 12 or 20 can be rotated while the other portion is held fixed. In order to facilitate hand rotation of first housing portion 12, while second housing 20 is fixed, the outer surface of second cylindrical wall 30 may include a plurality of gripping elements thereon (not shown) to provide a secure grip.

The present invention is useful in connecting a flexible conduit 16 to the threaded opening 15a and junction box 15. During use, conduit 16 may be connected to first housing 12 either prior or subsequent to connection of second housing 20 to junction box 15. For illustrative purposes, description will be made herein to the connection of conduit 16 to first housing 12 prior to the connection of second housing 20 to the junction box 15.

Conduit 16 is screw inserted into annular channel 34 of first housing 12. Helical threads 36 facilitate such insertion. As conduit 16 is made of a relatively pliable material and has a wall thickness which is substantially equal to the width of annular channel 34, the conduit will be seated in annular channel 34 in a snug fit thereby preventing moisture from tracking from the outside of connector assembly 10 to the inside at the juncture of conduit 16 to first housing 12. Water due to rain or similar weather conditions, is also prevented from entering cylindrical bore 22 by the relative arrangement of cylindrical walls 28 and 30. As above-described, inside cylindrical wall 28, which defines cylindrical bore 22, has an axial length which is substantially greater than the length of outside cylindrical wall 30. Thus, any water which may enter annular channel 34 from above (as shown in FIG. 1) will remain seated in the bottom of open-ended channel 34. Rain water contained in channel 34 will only rise as far as the upper extend 34a of the shorter wall of annular channel 34, and will not rise as far as the upper extent of cylindrical wall 28. Once the water level reaches the upper extend 34a of cylindrical wall 30, the water will flow out of the connector over cylindrical wall 30 rather than up to and over the longer wall 28. Thus, rain water which may enter annular channel 34 when connector 10 is held in an upright position shown in FIG. 1 will not enter bore 22.

Once raintight connection to conduit 16 is achieved, the connector 10 may be screw connected to an opening in junction box 15. Alternately, the second housing 20 may be inserted into a unthreaded opening where a lock nut or similar conventional securement device may be placed on the other side of junction box 15 to secure connector 10 thereto.

In addition to the raintight connection of conduit 16 to first housing 12, a raintight connection is also provided at the juncture of first housing 12 to second housing 20. As above-described, annular channel 54 is provided on second housing 20 which receives the insertion end 18 of first housing 12. In the vertical position shown in FIG. 1, water from rain or other weather conditions may enter the well formed by annular channel 54 to fill the channel 54 with water up to the upper extent 52a of the shorter outer cylindrical wall 52. Once the water has reached that level, the water will flow out of the connector, over the upper extent 52a of wall 52. As upper wall 50 of second portion 12, has a greater axial extent than cylindrical wall 52, water will not rise up into central bore 24 of second housing 20. Thus, as with the first housing 18, water cannot enter the interior of connector 10 due to the relative lengths of the respective walls 50 and 52.

As above-mentioned, the connector may be used in positions other than the vertical position shown. However, if used in other positions, water due to rain will more freely flow out of the connector over walls 30 and 52 and not rise anywhere near the level of walls 28 and 50. Thus, the worst case, i.e., vertical installation of connector 10 is described.

While the above-described connector performs exceptionally in providing a raintight connection between flexible conduit 16 and junction box 15, by taking advantage of the natural principle of water seeking its own level, it has been found that low viscous fluids, such as oil, kerosene, or the like, which may be abundant in certain areas where the connector may be employed will not respond as does water and may track up cylindrical wall 28 and upper portion 50 and may enter cylindrical bores 22 and 24 respectively.

In a preferred embodiment of the present invention, shown in FIG. 4, a combination raintight and oiltight connector 110 is shown. Connector 110 is substantially similar to connector 10 described hereinabove as can be screw coupled to junction box 115. Thus, for simplicity of explanation, like reference numerals will be used to denote like parts. As shown in detail in FIG. 4, first housing 112 of connector 110 includes a tapered extent 111 at the lower portion of cylindrical wall 128. This tapered extent provides an increasingly, narrowing, annular channel 134 for receipt of flexible conduit 116. As the flexible conduit 116 is screwed inserted into an annular channel 134, the conduit will engage the tapered portion 111 to provide an oiltight engagement therebetween. Thus, oil or other low viscous fluids will be prevented from entering cylindrical bore 122 by this tight engagement between conduit 116 and tapered portion 111.

Additionally, the engagement of first housing 112 with second housing 120 is also provided with an oiltight seal. As shown in FIG. 4, insert end 118 of first housing 112 includes a radially, outwardly, extending annular protuberance 119 which provides sealing means for sealable engagement with second housing 120. Annular protuberance 119 is of configuration which is complimentary to annular channel 54 of second housing 120. Protuberance 119 is constructed to provide an interference fit with channel 54 for frictional engagement therewith. The interference relationship between protuberance 119 and channel 54 is such that rotational movement of first housing 112, with respect to second housing 120, is permitted, yet the engagement provides an oiltight seal therebetween, thus, preventing tracking of oil into central bore 124. As constructed and shown in FIG. 4, connector 110 provides both raintight coupling of conduit 116 to junction box 115 as described hereinabove and also provides an oiltight engagement for preventing tracking of low viscous fluids into the central bore.

Various other modifications to the foregoing disclosed embodiments will be evident to those skilled in the art. Thus, the particularly described preferred embodiment is intended to be illustrative and not limited thereto. The true scope of the invention is set forth in the following claims.

I claim:

1. A connector for coupling an electrical conduit to an electrical enclosure having an opening comprising:
    a first elongate housing for receiving said conduit, said first elongate housing having a first passage therethrough; and
    a second elongate housing engageable with said first housing for rotatable movement therebetween said second housing including a second passage therethrough in communication and axially aligned with said first passage, said second elongate housing including means for engagement with said electrical enclosure adjacent said opening;
    said second elongate housing further including an open ended axially extending annular channel for receipt of a portion of said first housing;
    said channel being defined by a pair of substantially parallel circumferentially continuous walls, one wall of said pair being interior the other wall and defines a portion of said second passage, said one wall of said channel having a greater axial extent than the other said wall; and
    said first housing including a circumferential annular projection extending outwardly therefrom, and said second housing including plural spaced deflectable locking elements extending upwardly from said other wall for deflectable engagement with said projection for rotatably securing said first housing to said second housing, wherein said portion of said first housing received in said channel includes an annular protuberance extending outwardly therefrom engaging the interior surface of said other wall of said channel, whereby an oiltight seal is formed therebetween.

2. A connector in accordance with claim 1 wherein said locking elements are circumferentially spaced about said second housing.

3. A connector in accordance with claim 1 wherein said annular channel is positioned exteriorly of said second passage.

4. A connector in accordance with claim 1 wherein said engagement means of said second housing includes screw threads.

5. A connector in accordance with claim 1 wherein said first elongate housing further includes a second open ended axially extending annular channel for receipt of an end of said electrical conduit.

6. A connector in accordance with claim 5 wherein said second channel is defined by a first outer cylindrical wall and a second inner wall having a portion thereof tapered toward said first wall for engagement with said electrical conduit.

7. A connector in accordance with claim 6 wherein said inner wall of said second channel has an axial extent greater than said outer cylindrical wall.

8. A connector in accordance with claim 7 wherein said inner wall defines said first passage.

9. A connector in accordance with claim 8 wherein said inner wall includes a helical thread thereon, extending into said second annular channel for engagement with said electrical conduit.

* * * * *